United States Patent [19]

Williams

[11] Patent Number: 4,972,384

[45] Date of Patent: Nov. 20, 1990

[54] METHOD FOR IDENTIFYING HYDROCARBON-ZONES IN SUBSURFACE FORMATIONS

[75] Inventor: D. Michael Williams, Grapevine, Tex.

[73] Assignee: Mobil Oil Corporation, Fairfax, Va.

[21] Appl. No.: 467,106

[22] Filed: Jan. 18, 1990

[51] Int. Cl.$^5$ ............................................. G01V 1/30
[52] U.S. Cl. ...................................... 367/75; 364/421
[58] Field of Search ..................... 367/75, 38; 364/421

[56] References Cited

U.S. PATENT DOCUMENTS

| | | | |
|---|---|---|---|
| 3,332,238 | 7/1967 | Caldwell | 340/860 |
| 3,362,011 | 1/1968 | Zemanek, Jr. | 340/860 |
| 4,254,479 | 3/1981 | Wiley | 367/35 |
| 4,375,090 | 2/1983 | Thompson et al. | 367/75 |
| 4,383,308 | 5/1983 | Caldwell | 367/31 |
| 4,422,165 | 12/1983 | Thomas et al. | 367/40 |
| 4,516,228 | 5/1985 | Zemanek, Jr. | 367/75 |
| 4,649,525 | 3/1987 | Angona et al. | 367/75 |
| 4,692,910 | 9/1987 | Sondergeld et al. | 367/75 |
| 4,779,237 | 10/1988 | Bodine | 367/47 |
| 4,858,200 | 8/1989 | Goins | 367/75 |

OTHER PUBLICATIONS

"A Case Study of Stratigraphic Interpretation Using Shear and Compressional Data", Geophysics, vol. 49, #5, May '84, pp. 509–521.

"Relationships Between Compressional-Wave and Shear-Wave Velocities in Clastic Silicate Rocks", J. P. Castagna, M. L. Batzle, R. L. Eastwood, Geophysics, vol. 50, No. 4 (Apr. 1985), pp. 571–581.

"A New Method for Shear-Wave Logging", Choro Kitsunezaki, Geophysics, Oct. 1980, pp. 1487–1506.

Primary Examiner—Ian J. Lobo
Attorney, Agent, or Firm—Alexander J. McKillop; Charles J. Speciale; George W. Hager, Jr.

[57] ABSTRACT

A compressional-to-shear wave velocity ratio is measured in a subsurface sandstone formation. Ratios of compressional-to-shear wave velocity are determined over a plurality of shear wave travel times in water-bearing sandstone and shale. The subsurface sandstone formation is identified as being hydrocarbon-bearing when the measured compressional-to-shear wave velocity ratio in the subsurface formation is less than an identified minimum of the compressional-to-shear wave velocity ratios determined for water-bearing sandstone and shale.

14 Claims, 10 Drawing Sheets

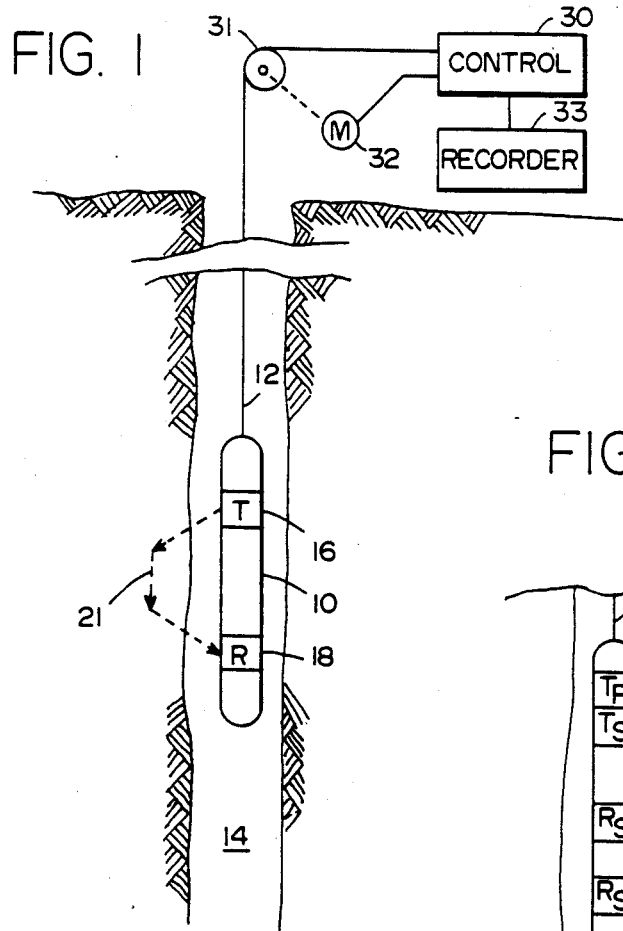
FIG. 1
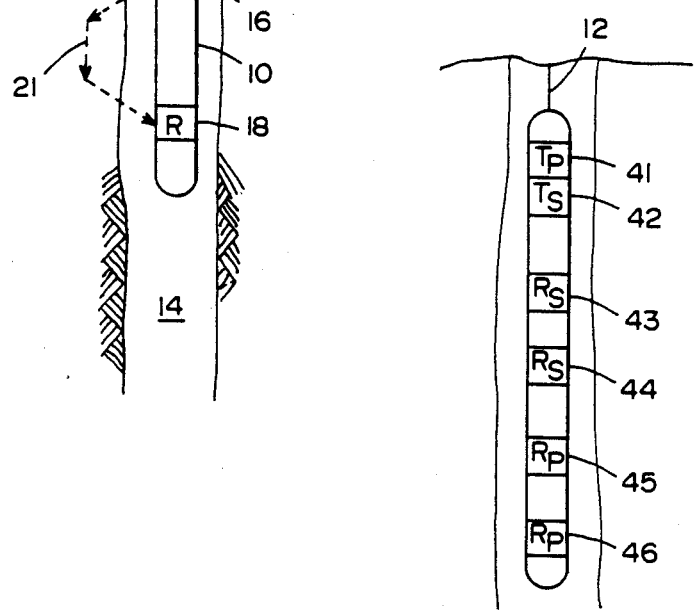
FIG. 3
FIG. 2
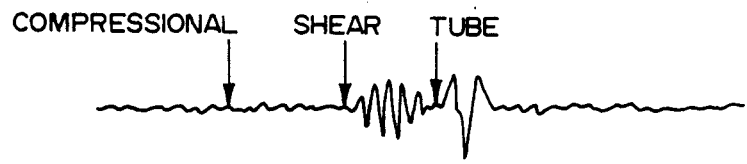

METHOD FOR IDENTIFYING HYDROCARBON-ZONES IN SUBSURFACE FORMATIONS

BACKGROUND OF THE INVENTION

It is a well known practice to survey a well by acoustic logging techniques in which acoustic signals are generated and received by means of a logging tool run through the well. One such acoustic logging technique involves the generation and reception of acoustic signals and the determination of the travel time of the acoustic signals between a transmitter and a receiver or between spaced receivers. By this technique the velocity of sound through a subsurface formation may be determined in order to characterize the formation.

An acoustic signal may be transmitted through a subsurface formation in the form of both compressional and shear waves. The compressional wave represents acoustic energy which has been refracted through the formation adjacent the wellbore. The compressional wave travels as a fluid pressure wave in the wellbore mud from the transmitter to the formation where it travels at the compressional wave velocity of the particular formation. The compressional wave then travels to the receiver through the wellbore mud as a fluid pressure wave. The shear wave is also refracted through the formation adjacent the wellbore. Unlike the compressional wave, the shear wave travels at shear velocity through the formations.

The velocities of compressional and shear acoustic waves traveling through a formation are dependent on such formation parameters as type of lithology, degree of compaction and cementation, effective overburden stress, porosity and type of saturating fluid. In general, a change in any one of these parameters will cause both compressional and shear velocities to either increase or decrease proportionately. The notable exception to this rule is the acoustic response to gas as part or all of the pore filling fluid of the formation. The introduction of a small amount of gas in the pore spaces causes a large reduction in compressional velocity. At the same time, increasing gas saturation causes a small increase in shear velocity.

Because of these effects on the compressional and shear wave velocities, the result of replacing water with gas in the pore spaces is a large reduction in the ratio of the compressional wave velocity ($V_p$) to the shear wave velocity ($V_s$). The magnitude of the reduction is relatively independent of both formation porosity and gas saturation, and is most sensitive to the initial compressibility of the matrix.

It is a specific object of the present invention to utilize the measurement of $V_p/V_s$ in a new and improved way to identify hydrocarbon-bearing zones where the compressional and shear wave velocities vary significantly from water-bearing clastics, i.e. sandstones and shales. Such an objective can be particularly useful in zones where resistivity logs do not provide adequate delineation of hydrocarbon-bearing zones. This would include low resistivity pay zones where resistivities are lower than in normal hydrocarbon-bearing zones due to formation properties and areas with fresh formation waters where high resistivities are common in water-bearing zones. In both cases, resistivity logs may not provide the simple, reliable identification of hydrocarbon-bearing zones that is possible in more typical reservoirs.

SUMMARY OF THE INVENTION

In accordance with the present invention there is provided a new and improved method for identifying potentially hydrocarbon-bearing zones in subsurface clastic formations. A correlation is determined between shear wave travel time and the ratio of compressional wave velocity to shear wave velocity in water-bearing sandstone and shale. The ratio of compressional wave velocity to shear wave velocity is measured in a subsurface sandstone formation. A hydrocarbon-bearing zone is identified in such subsurface sandstone formation when the measured compressional-to-shear wave velocity ratio in the formation is less than the determined correlation in water-bearing sandstone and shale.

More particularly, ratios of compressional wave velocity to shear wave velocity are determined over a plurality of shear wave travel times in both a water-bearing sandstone and a water-bearing shale and the regressions of such ratios over such travel times identified. A minimum value is determined for the pair of ratio regressions over the range of shear wave travel times. A compressional-to-shear wave velocity ratio is then measured in a select subsurface sandstone formation and such ratio is compared to the identified minimum for the pair of ratio regressions. The subsurface sandstone formation is identified as hydrocarbon-bearing when the compressional-to-shear wave velocity ratio measured in the formation is less than the identified minimum for the pair of ratio regressions.

In a more specific aspect, the compressional-to-shear wave velocity regressions for sandstone and shale are represented by a pair of linear regression lines. The minimum of such regression lines is identified with those portions of such regression lines that exhibit the minimum value for compressional-to-shear wave velocity ratio at any given shear wave travel time. A hydrocarbon indicator line is derived at a uniform offset distance below the identified minimum for the pair of regression lines. Any subsurface sandstone formation having a measured compressional-to-shear wave velocity ratio that falls below the hydrocarbon indicator line is identified as being hydrocarbon bearing. The offset for the hydrocarbon indicator line from the identified minimum for the pair of regression lines is chosen such that only a select percentage of water-bearing sandstones and shales will be incorrectly identified as hydrocarbon-bearing sandstones in the subsurface formation being investigated.

BRIEF DESCRIPTION OF THE DRAWINGS

FIG. 1 is a diagrammatic illustration of a well logging system employed to measure acoustic energy velocity through subsurface formations adjacent a borehole.

FIG. 2 illustrates a typical acoustic waveform that might be recorded by the well logging system of FIG. 1.

FIG. 3 illustrates a downhole logging sonde employing a plurality of acoustic transmitters and acoustic receivers for use in the well logging system of FIG. 1.

DESCRIPTION OF THE PREFERRED EMBODIMENT

Figure 4:
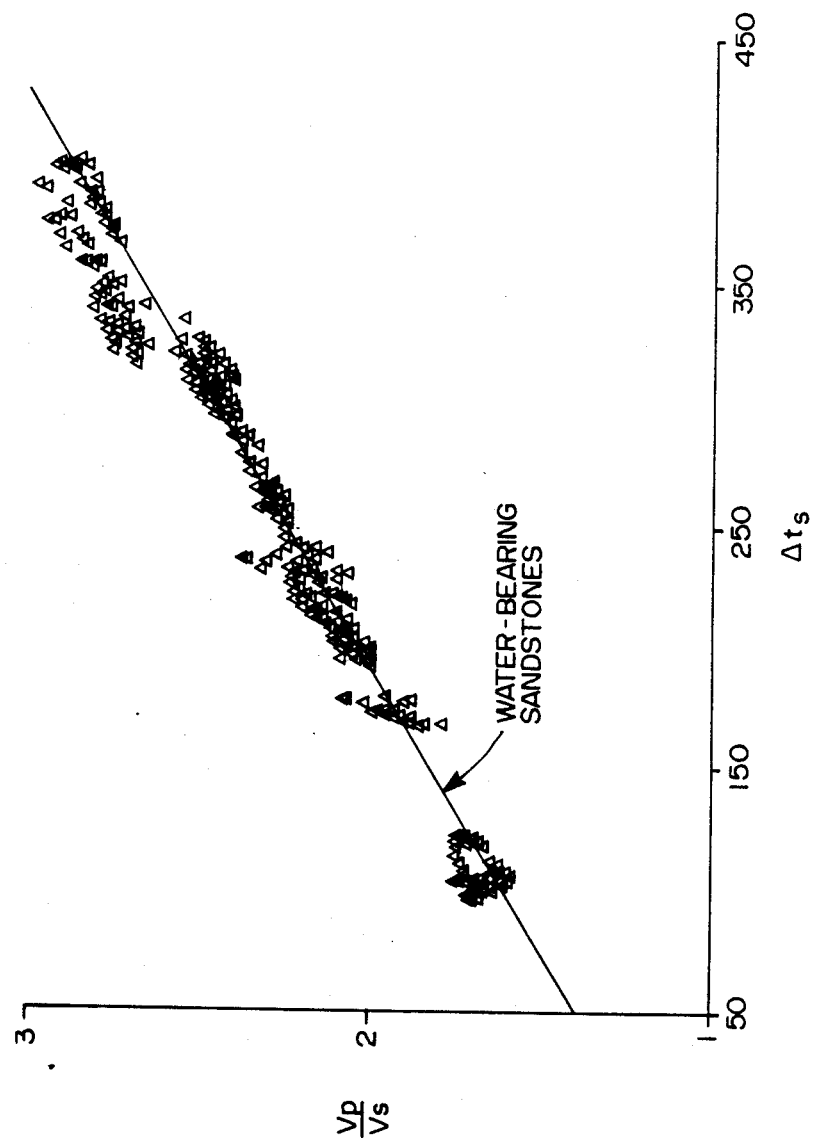
FIGS. 4–6 and 10 are crossplots of compressional-to-shear velocity ratios versus shear wave travel times measured and calculated in accordance with the method of the present invention for select clastics.

Referring further to FIG. 1, there will be briefly described an acoustic borehole logging system with which compressional wave velocity ($V_p$) and shear wave velocity ($V_s$) measurements may be made in a subsurface formation which is to be identified as to its hydrocarbon content in accordance with the method of the present invention. The simplest acoustic logging system comprises logging tool 10 suspended by cable 12 for movement along the length of the borehole 14. The logging tool includes an acoustic source or transmitter 16 for the production of repetitive time-spaced pulses of acoustic energy. An acoustic detector or receiver 18 senses each of the generated acoustic pulses and converts them into representative electrical signals. An exemplary signal output of detector 18 is illustrated in FIG. 2. The waveform of FIG. 2 is shown to comprise a wavetrain, including several separately identifiable, compressional and shear wave events, as well as a tube wave event. The uphole components include a surface control panel 30 to which the cable 12 is directed over the sheave 31. A motor 32, which is controlled from the surface control panel 30, operates the sheave 31 for raising and lowering the logging tool 10 in the borehole 14. An output means, such as a digital recorder 33, is electrically connected to the surface control panel for recording and/or displaying the date detected from the logging tool 10.

A more preferred embodiment of the acoustic logging tool of FIG. 1 is illustrated in FIG. 3 where the logging tool 40 includes a compressional wave transmitter 41, a shear wave transmitter 42, a pair of spaced-apart shear wave receivers 43 and 44, and at least a pair of spaced apart compressional wave receivers 45 and 46. The use of multiple transmitters and receivers is to better distinguish between the compressional, shear and tube waves which are often difficult to distinguish by the use of a single receiver. Since travel time differentials increase with increasing distance from the transmitter source, wave fronts which are closely spaced at single receiver locations will separate by the time of their receipt at remote receiver locations. Various techniques for collecting and analyzing compressional, shear and tube wave data are more completely described in U.S. Pat. Nos. 3,333,238 (Caldwell), 3,362,011 (Zemanek, Jr.) and 4,516,228 Jr.).

Recently, attention has been directed to developing transmitters which are particularly suited to shear wave logging. Such transmitters generally attempt to achieve a single point force application of sound energy to the borehole wall. The theory behind point force transmitters, as generally outlined in "A New Method of Shear Wave Logging", Geophysics. Vol. 45, No. 10 (Oct. 1980), pp. 1489-1506, by Choro Kitsunezaki, is that they are capable of directly generating shear waves. Conventional multidirectional transmitters are said to be capable only of indirectly creating shear waves. Point force type transmitters produce shear waves of substantially higher amplitudes than heretofore possible with conventional multidirectional compression wave transmitters. Accordingly, formations, such as loosely consolidated or unconsolidated sand, which do not propagate shear waves in sufficient amplitudes to permit definitive detection using conventional compression wave receivers, may now be shear wave logged with these shear wave logging systems. U.S. Pat. Nos. 4,383,308 (Caldwell) and 4,649,525 (Angona and Zemanek) describes a shear wave acoustic logging system employing such a point force transmitter for the shear wave generation.

Having set forth above the borehole logging systems of FIGS. 1 and 3, as well as in the above-referenced U.S. patents, there will now be described the method of the present invention for use of compressional and shear wave recordings from such systems to identify hydrocarbon-bearing zones in subsurface formations particularly where the acoustic travel times of compressional and shear waves differ significantly from the travel times in water-bearing clastics (sandstones and shales). More particularly, the method of the present invention predicts based on an empirical correlation between the shear wave travel time and $V_p/V_s$ in water-bearing clastics and compares such predicted $V_p/V_s$ to the measured $V_p/V_s$ in the subsurface formation to be identified as to hydrocarbon-bearing content. From such comparison the hydrocarbon-bearing content is identified. It has long been observed that compressional and shear velocities are strongly interdependent in water-bearing sediments and that the compressional-to-shear wave velocity ratio ($V_p/V_s$) could be used as a lithology indicator to differentiate between sandstones, dolomites, and limestones. Castagna, Batzle, and Eastwood in an article entitled "Relationships Between Compressional-Wave and Shear-Wave Velocities in Clastic Silicate Rocks", Geophysics. Vol. 50, No. 4 (April 1985), pgs. 571-581 concluded that shear velocity is nearly linearly related to compressional velocity in water-bearing clastics.

In order to understand these implications, it is convenient to establish the following definitions:

$\Delta t_p$ ™ formation compressional wave travel time (slowness), $V_p$ = formation compressional velocity = $1/\Delta t_p$, $\Delta t_s$ = formation shear wave travel time (slowness), $V_s$ = shear velocity = $1/\Delta t_s$ $V_p/V_s = \Delta t_s/\Delta t_p$ = ratio of compressional to shear velocity.

Based on the Castagna et al. results, the premise of a linear relationship between $V_p$ and $V_s$ is accepted as a valid assumption. Therefore, $$V_s = \alpha V_p + \beta \qquad (1)$$

in water-bearing sandstones. Equivalently, $$V_p = AV_s + B. \qquad (2)$$

Equation (2) can be expressed in terms of logging parameters by dividing both sides by $V_s$:

$$V_p/V_s = A\, V_s/V_s + B/V_s = A + B\Delta t_s \qquad (3)$$

Equation 3 agrees with Castagna et al. but there is a significant difference in perspective in contrast to their work. Since shear velocities are not affected by the type of saturating fluid contained in the rock pore spaces, defining compressional velocity as the dependent variable (rather than as the independent variable as in Castagna et al.) enables the estimation of what the $V_p/V_s$ would be in water-bearing sediments irrespective of the actual saturating fluid type. Comparison of the measured $V_p/V_s$ to the predicted $V_p/V_s$ enables the determination of zones which have a saturating fluid with a compressibility which is significantly different than water.

It is standard practice in petrophysics to use travel time measurements. The present invention is concerned only with the development of a method to identify $V_p/V_s$ ratios which are indicative of hydrocarbons using shear and compressional travel times. As can be seen from equations (2) and (3), a completely equivalent algorithm can be established for compressional and shear velocities.

FIG. 4 is a crossplot of $\Delta t_s$ to $V_p/V_s$, illustrating the relationship between shear wave travel time and the ratio of compressional wave to shear wave velocities ($V_p/V_s$) existing in water-bearing sands and an empirically determined regression line. Data for this crossplot were obtained in water-bearing sandstones ranging in age from Jurassic to Plio-Pleistocene. Standard least-squares regression analysis establishes that $$V_p/V_s(\text{sandstones}) = 1.182 + 0.00422 \Delta t_s \quad (4)$$

for water-bearing sandstone ($\Delta t_s$ in μsec/ft).

If water-bearing shales behave similarly to water-bearing sandstones, the minimum $V_p/V_s$ that can be expected for a given shear travel time for the two lithologies needs to be established. Any reduction in $V_p/V_s$ below this minimum can be attributed to the replacement of water in the pores by a more compressible fluid, such as oil or gas.

Figure 5:
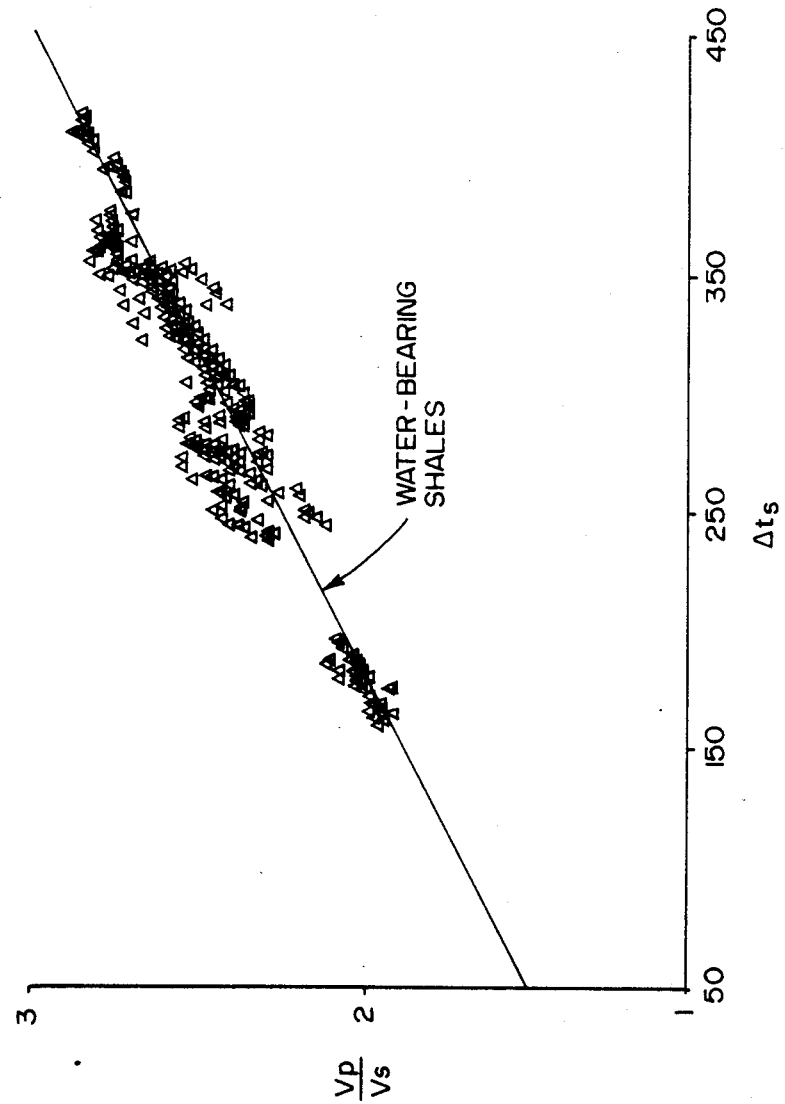

FIG. 5 is a crossplot of $V_p/V_s$ versus $\Delta t_s$ for shales illustrating an empirically derived regression line. The relationship between $V_p/V_s$ and $\Delta t_s$ is similar to the correlation shown in FIG. 1. Since only the minimum $V_p/V_s$ ratio is to be defined for a given shear travel time, those shales which have unusually large $V_p/V_s$ ratios have been edited from the data set in FIG. 5.

Standard least-squares regression analysis establishes that $$V_p/V_s(\text{shales}) = 1.276 + 0.00374 \Delta t_s \quad (5)$$

for water-bearing shales ($\Delta t_s$ in μsec/ft).

The log data indicate that $V_p/V_s$ in shales is also approximately a linear function of the compressional or shear travel time.

Figure 6:
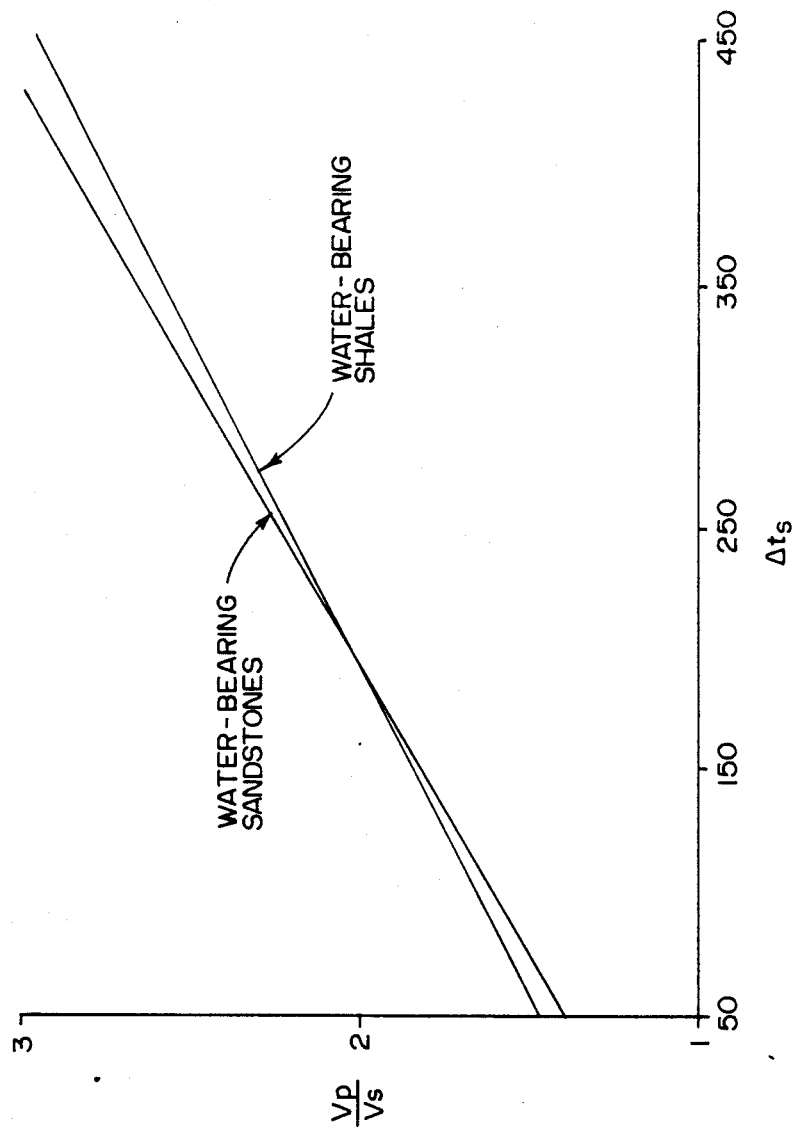

Both regression lines of FIGS. 4 and 5 are plotted in FIG. 6. The lines are almost coincident over the range of shear travel times typically encountered in both hydrocarbon-bearing and water-bearing formations (~75–450 μsec/ft). This allows the method of the present invention to detect hydrocarbons using the acoustic logs without further information from other logs concerning lithology. In other words, a single minimum $V_p/V_s$ will be derived from the crossplot of FIG. 6 which will differentiate between hydrocarbon-bearing intervals and either water-bearing sands or shales. As can be seen in FIG. 6 this minimum $V_p/V_s$ is represented by the water-bearing sandstone regression line for shear wave travel times $\Delta t_s$ below about 197 microseconds per foot and by the water-bearing shale regression line for $\Delta t_s$ above about 197 microseconds per foot. While the foregoing describes the detection of hydrocarbons without the use of lithology information from other logs, information from other logs concerning lithology can be coupled with the correlation in sandstones to provide a hydrocarbon indication.

As noted above, replacing water with a more compressible fluid in the pore spaces of a formation causes large increases in compressional wave travel times while shear wave travel times are decreased very slightly. This results in a large reduction of $V_p/V_s$ in hydrocarbon-bearing sandstones when compared to water-bearing clastics with similar shear wave travel times. Hydrocarbon-bearing data points will thus be moved down and to the left from an equivalent water-bearing clastic data points on the crossplots of FIG. 6 Hence, a hydrocarbon-bearing sandstone zone can be identified in a subsurface formation when the measured $V_p/V_s$ in the zone is found to be less than the determined minimum $V_p/V_s$ for a given shear wave travel time $\Delta t_s$ in a water bearing clastic.

However, errors in measurements of $V_p/V_s$ and $\Delta t_s$ as well as the effects of variations in lithology can influence the effectiveness of such a direct comparison between measured $V_p/V_s$ in the formation and the derived minimum $V_p/V_s$ for water-bearing clastics. It is therefore also a feature of the present invention to apply statistical differentiation techniques to optimize such comparison.

To optimize such comparison a variable is defined which characterizes the measurements and determines the effects of errors in the measurements on that variable. This variable is a function of the measured $\Delta t_s$ and $V_p/V_s$. Errors will include the effects of variations in the lithology as well as the effects of errors in the measurements of $\Delta t_p$ and $\Delta t_s$. The errors cause the variable to exist over a range of results and the variable is approximated using a random number which can be described by a probability distribution. Since water-bearing sandstones and water-bearing shales have different regression lines as seen from FIGS. 4–6, random variables are derived for both such sandstones and shales.

Referring again to FIG. 6, sandstones tend to have a lower $V_p/V_s$ for a given $\Delta t_s$ than do shales when $\Delta t_s$ is less than about 197 microseconds per foot. Conversely, shales tend to have a lower $V_p/V_s$ for a given $\Delta t_s$ than do shales when $\Delta t_s$ is less than about 197 microseconds per foot. Conversely, shales tend to have a lower $V_p/V_s$ for a given $\Delta t_s$ than do sandstones when $\Delta t_s$ is greater than about 197 microseconds per foot. Since the method of the present invention is to develop a lithology-independent hydrocarbon indicator using compressional and shear wave travel times, it is necessary to differentiate, firstly, between hydrocarbon-bearing sandstones and water-bearing sandstones below $\Delta t_s$ of 197 microseconds per foot and, secondly, between hydrocarbon-bearing sandstones and water-bearing shales above $\Delta t_s$ of 197 microseconds per foot.

Referring firstly to the differentiation of hydrocarbon-bearing and water-bearing sandstones, both are represented by a random variable which has a different mean and standard deviation for each interval type. Any new data pair (i.e., a measurement of $\Delta t_s$ and $V_p/V_s$ at a single depth point) can be classified as either water-bearing or hydrocarbon-bearing by computing the value of the random variable for that particular depth and comparing it to a predetermined threshold. Data points represented by values of the random variable larger than the threshold belong to one class (i.e., water-bearing sandstones) and data points represented by values less than the threshold belong to the other class (i.e., hydrocarbon-bearing sandstones). The threshold value can be determined using any of several different methods. For purposes of example, the threshold is determined in such a manner that the probability of correctly identifying a water-bearing sandstone is approximately 95%.

A random variable $\epsilon$ is defined as:

$$\epsilon = V_p/V_s(\text{measured}) - (1.182 + 0.00422\Delta t_s). \quad (6)$$

The term in parenthesis is that of equation (4) and is the estimated minimum value that $V_p/V_s$ would have in a water-bearing sandstone for a given shear travel time. This means that $\epsilon$ is a zero mean random variable which can be assumed to be normally distributed for water-bearing sandstone. Calculating the same quantity in a hydrocarbon-bearing zone results in a random variable (assumed to be normally distributed) with non-zero mean and a different standard deviation. Two Gaussian or normal distributions can be used to estimate the distribution of $\epsilon$ for both the water-bearing and hydrocarbon-bearing cases.

Figure 7:
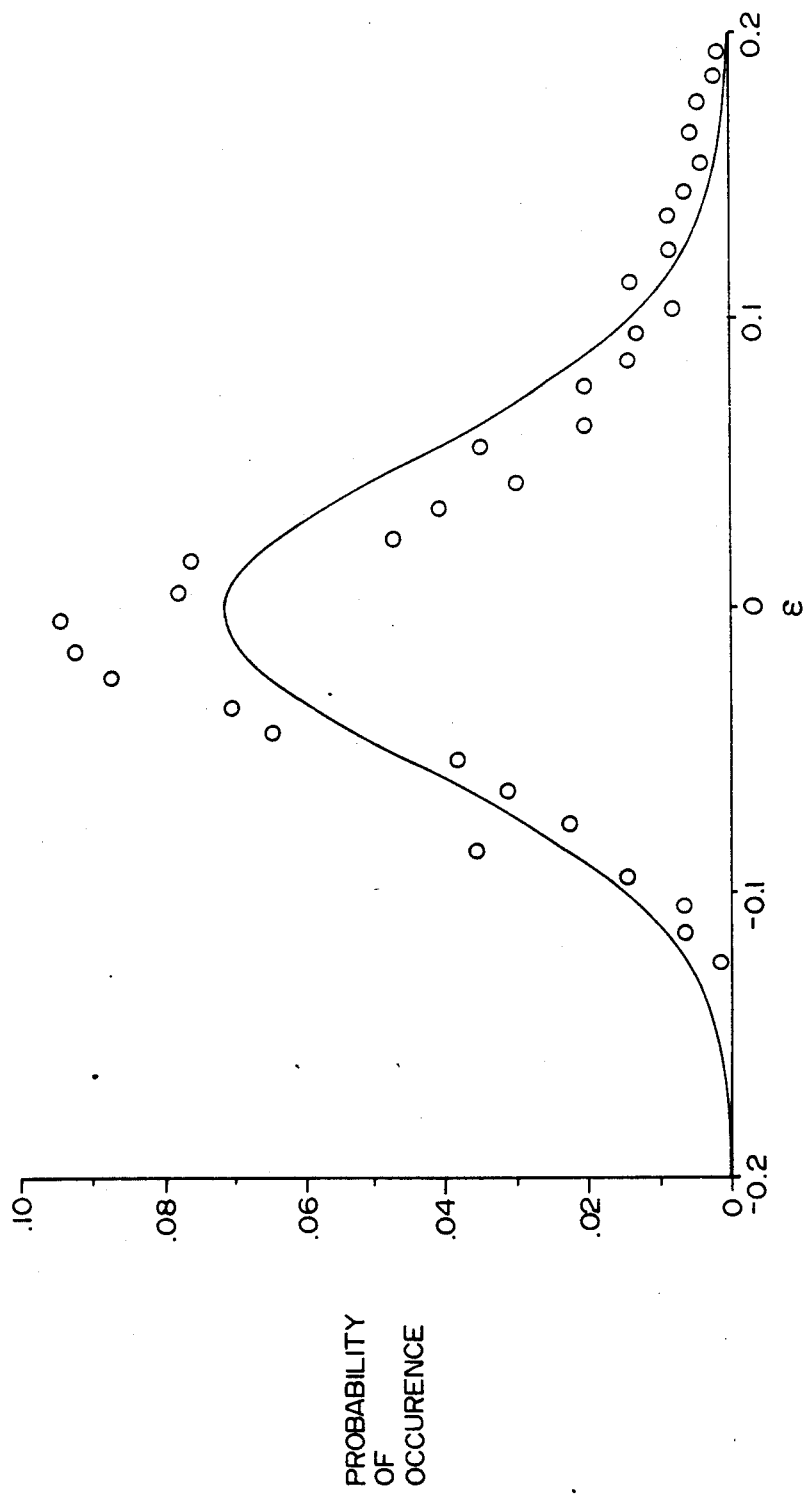
FIGS. 7–9 are histograms of the frequency of occurance of various values of random variables derived in accordance with the method of the present invention for select clastics.

The frequency distribution plot for $\epsilon$ in the water-bearing sandstone is shown in FIG. 7. The figure is a histogram of the frequency of occurrence of various values of $\epsilon$. The solid line is the best fit Gaussian distribution. The Gaussian distribution can be used to estimate that only 5% of water-bearing sands can be expected to have $\epsilon$ less than $-0.09$. Using this information allows a simple discriminator to be developed to distinguish hydrocarbon-bearing from water-bearing sandstones.

Figure 8:
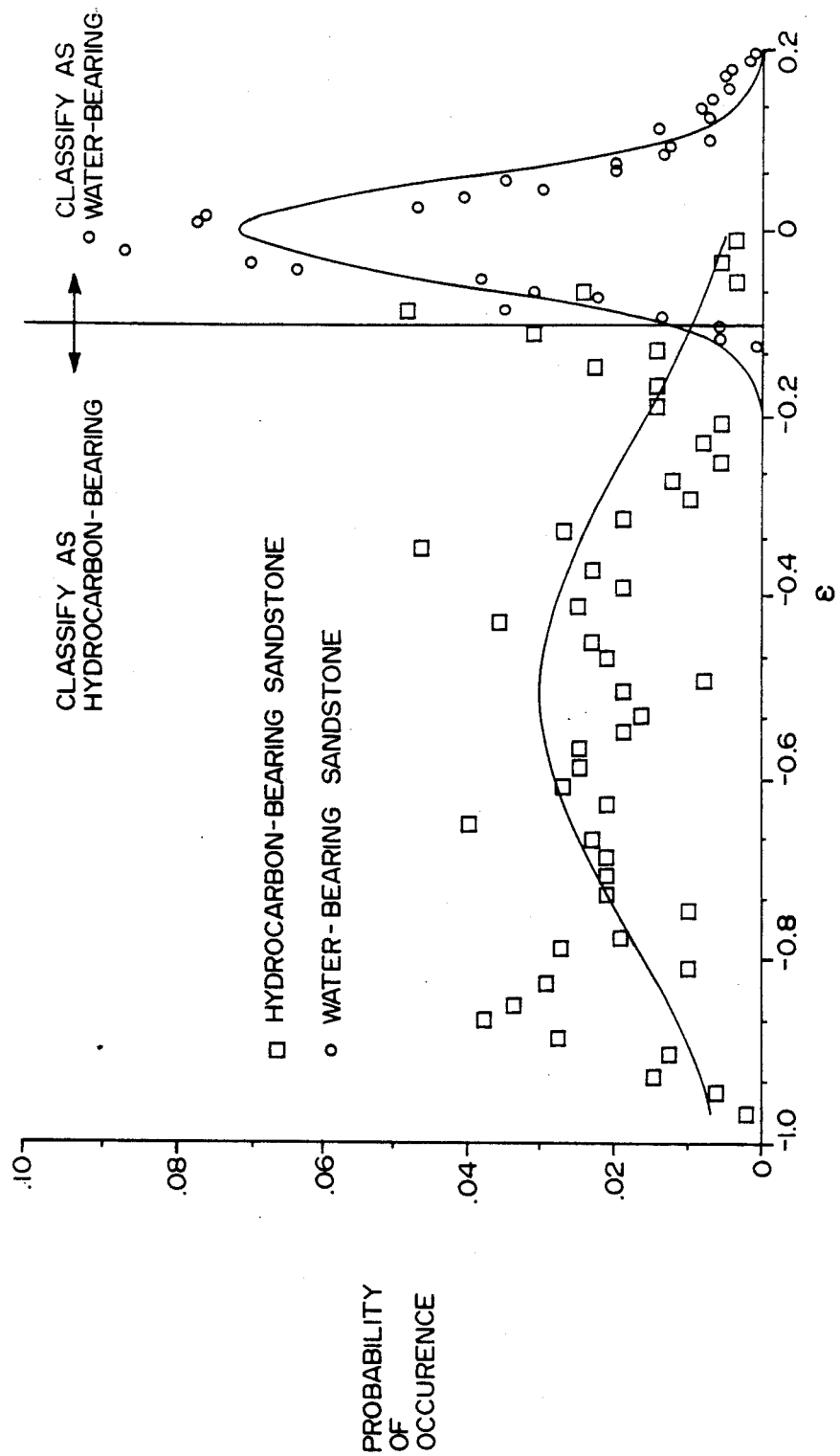

FIG. 8 compares $\epsilon$ computed in hydrocarbon-bearing zones (restricted to those intervals where $\Delta t_s > 130$ $\mu$sec/ft) with $\epsilon$ computed in water-bearing sandstones. Under the assumption that the data approximate the true Gaussian distributions of $\epsilon$ in both water-bearing and hydrocarbon-bearing intervals, 95% of all water-bearing sandstones will have $\epsilon \geq -0.09$. In addition, about 94% of all hydrocarbon-bearing sandstones will have $\epsilon < -0.09$.

It should be noted at this point that the assumption that $\epsilon$ is normally distributed is not essential. Since the discrimination is between the means of $\epsilon$ in water-bearing and hydrocarbon-bearing intervals, the distribution of $\epsilon$ is irrelevent except in estimating the probability of successfully identifying the type of saturating fluid. Careful examination of the data in FIG. 7 suggests that there is a bias towards large values of $\epsilon$, which is not totally consistent with the assumption that the data are normally distributed. This bias is most likely caused by the introduction of heavy mineral cements (such as calcite) in some of the water-bearing intervals in the data set. Although this bias will result in a small error in our estimates of successfully identifying water-bearing sandstones, it does not have any impact on the methodology used.

Referring secondly to the differentiation of hydrocarbon-bearing sandstones and water-bearing shales, a new random variable $\epsilon'$ is defined as:

$$\epsilon' = V_p/V_s(\text{measured}) - (1.276 + 0.00374\Delta t_s). \quad (7)$$

Figure 9:
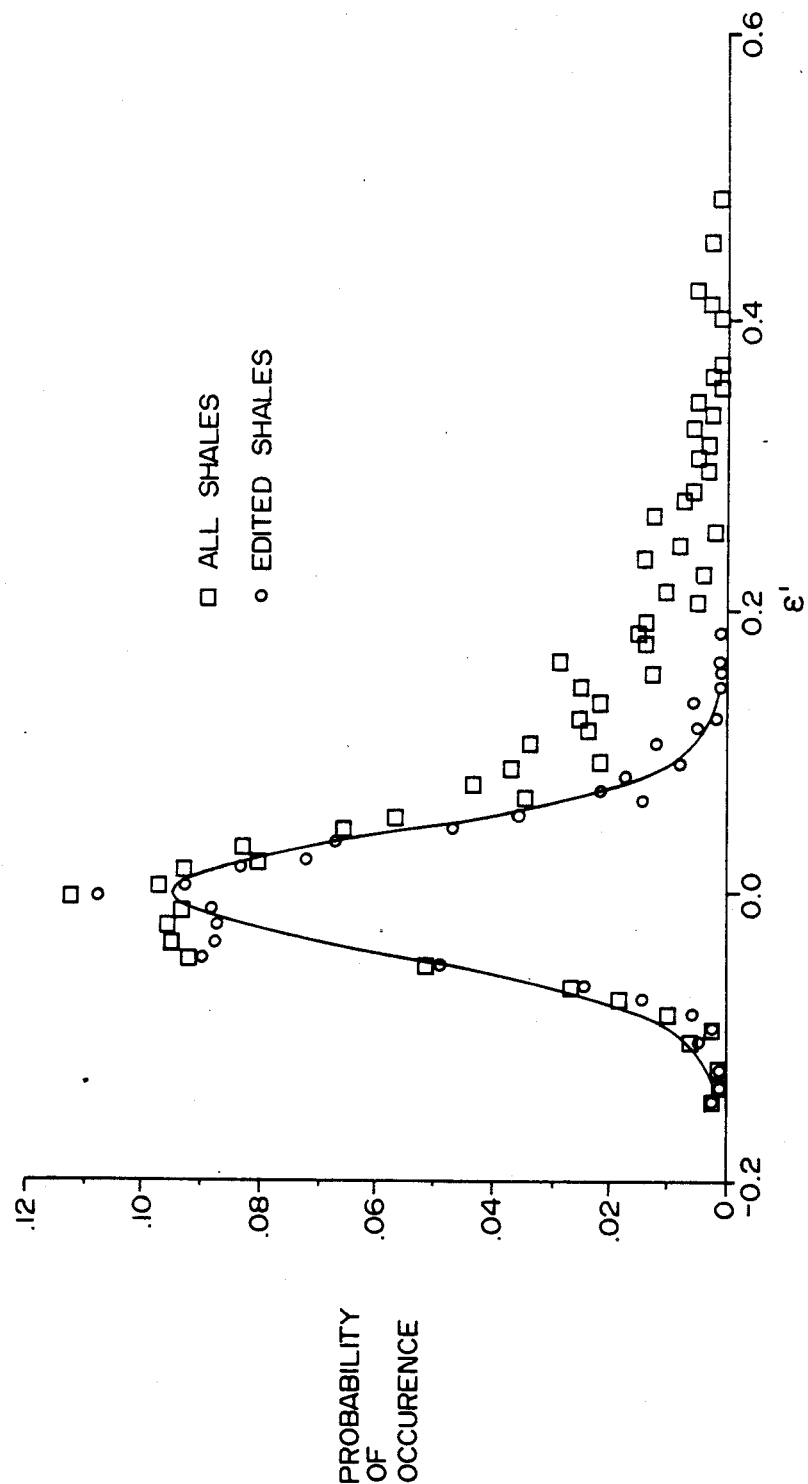

The term in the parentheses is the estimated minimum value that $V_p/V_s$ can be expected to measure in a water-bearing shale corresponding to a given value of $\Delta t_s$. The frequency distribution plot for $\epsilon'$ in shales is shown in FIG. 9. The figure is a histogram of the frequency of occurrence of various values of $\epsilon'$ for both the full shale data set and the edited data set.

The solid line is the best fit Gaussian distribution for the edited shale data set. Note that the full data set has a bias towards larger values of $\epsilon'$ but that the data points which produce this bias will be correctly classified as water-bearing. The Gaussian distribution can be used to estimate that only 5% of shales can be expected to have $\epsilon'$ less than $-0.073$. Using this information allows a simple discriminator to be developed to distinguish hydrocarbon-bearing sandstones from water-bearing shales.

Under the assumption that the data approximate the true Gaussian distributions of $\epsilon'$ in hydrocarbon-bearing sandstones and $\epsilon'$ in shales, 95% of all water-bearing shales will have $\epsilon' \geq -0.073$. In addition, about 92% of hydrocarbon-bearing sandstones will have $\epsilon' < -0.073$.

Since hydrocarbon-bearing sandstones can now be successfully differentiated from both water-bearing sandstones and shales, compressional and shear travel time logs can be used to generate an acoustic log hydrocarbon indicator (ALHI) as follows:

Using the statistical approach described above, a threshold for the minimum $V_p/V_s$ that can be expected in most water-bearing clastics can be defined as:

$$V_p/V_s \text{ (minimum for water-bearing clastics)} + \quad (8)$$

$$\min [V_p/V_s \{\text{sandstone (Eq. 4)}\}, V_p/V_s \{\text{shale (Eq. 5)}\}] -$$

offset, where offset = 0.09.

Figure 10:
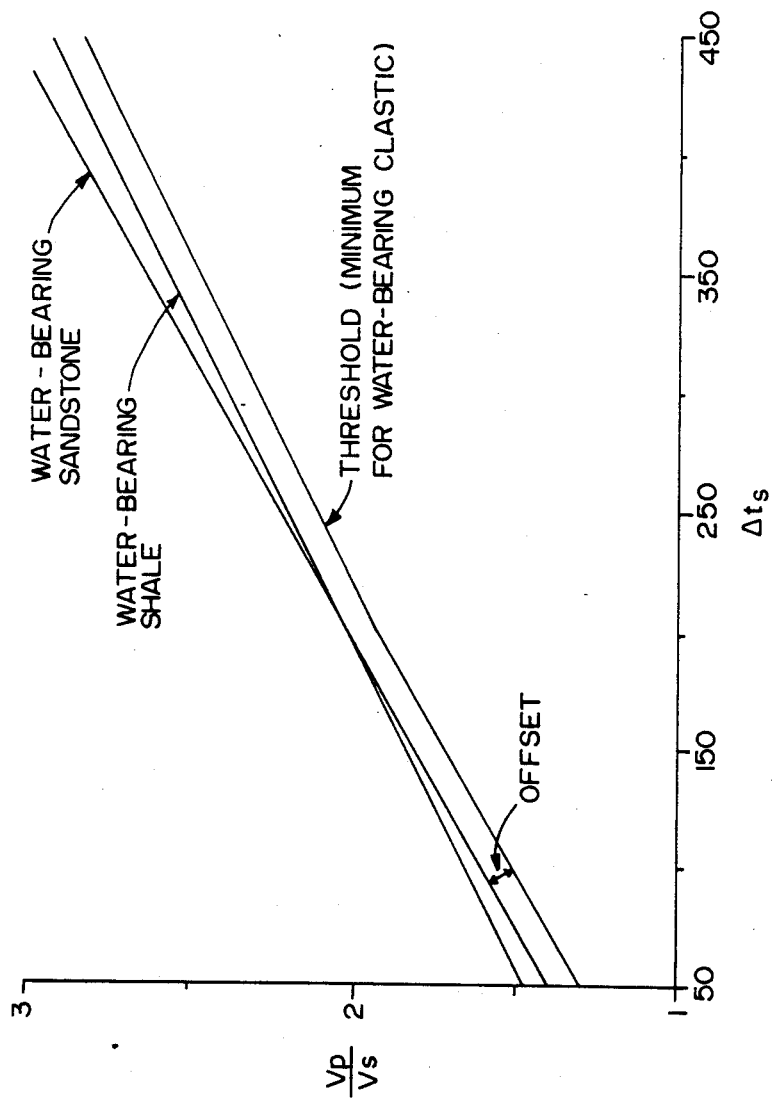

The offset accounts for the statistical variations in the data in such a way that about 95% of the data points measured in water-bearing clastics will plot above the threshold. FIG. 10 illustrates the two regression lines and the threshold for the minimum $V_p/V_s$ of the two regression lines as defined by equation (8) for water-bearing clastics. About 92% of the points which plot below the threshold represent hydrocarbon-bearing intervals. New data points are classified as hydrocarbon-bearing if they plot below the threshold and will therefore generate a hydrocarbon indication. Points plotting above the threshold are designated as water-bearing.

Figure 11:
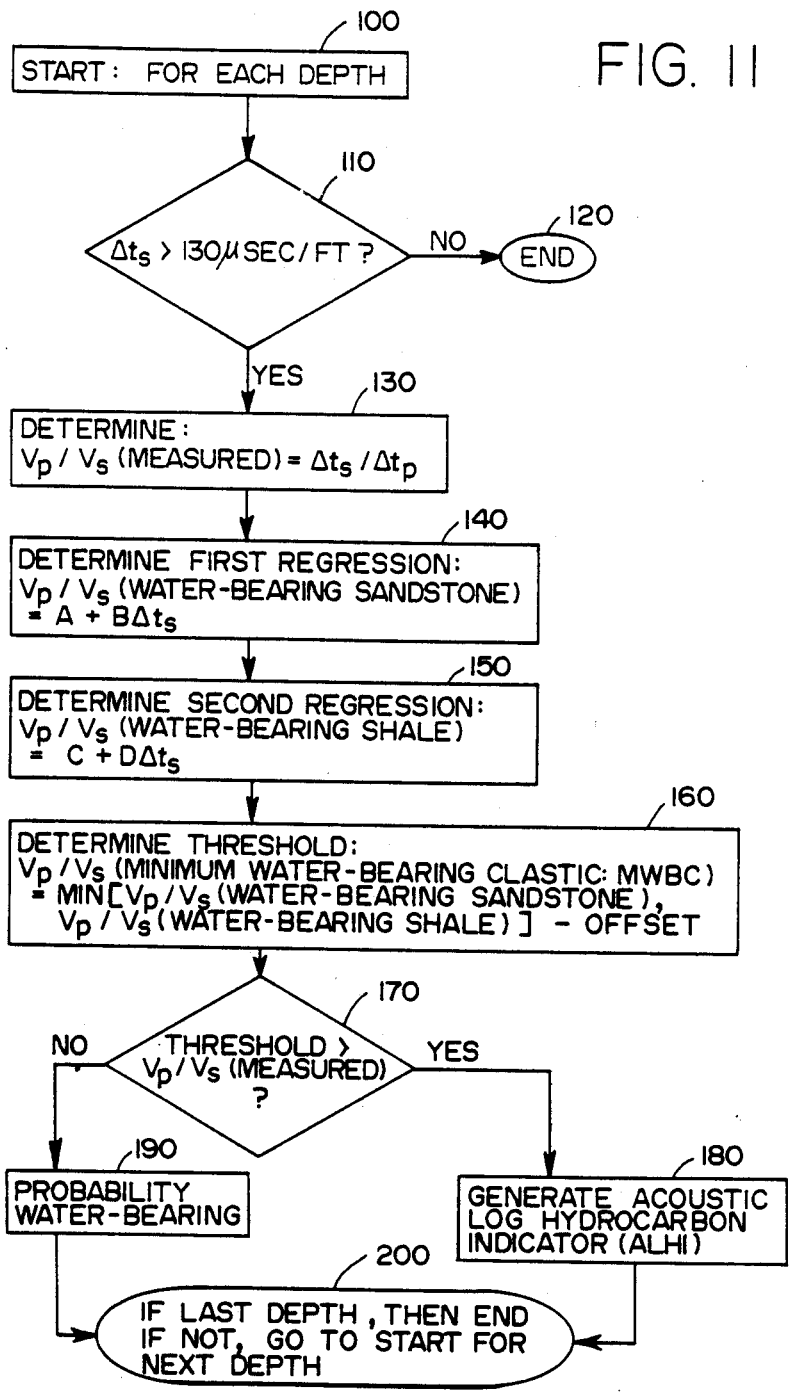
FIG. 11 is a flow chart of a preferred algorithm for use in carrying out the method of the present invention.

The flow chart of FIG. 11 depicts an algorithm which can be used to determine if a given pair of $\Delta t_p$ and $\Delta t_s$ measured values are from an interval which is potentially hydrocarbon-bearing.

STEP 110: If $\Delta t_s < 130$ $\mu$sec/ft, STOP. The formation is too well consolidated to generate a reliable hydrocarbon indication.

STEP 130: Determine $V_p/V_s$ (measured) = $\Delta t_s/\Delta t_p$.

STEP 140: Determine first regression (minimum water-bearing sandstone) from $\Delta t_s$ and equation (4).

STEP 150: Determine second regression $V_p/V_s$ (minimum water-bearing shale) from $\Delta t_s$ and equation (5).

STEP 150: Determine threshold $V_p/V_s$ (minimum water-bearing clastics) from equation (8).

STEP 170: Compare $V_p/V_s$ (measured) to threshold.

STEP 180: If $V_p/V_s$ (measured) < threshold, the point is identified as hydrocarbon-bearing.

STEP 190: If $V_p/V_s$ (measured) $\geq$ threshold, the point is identified as water-bearing.

Figure 12:
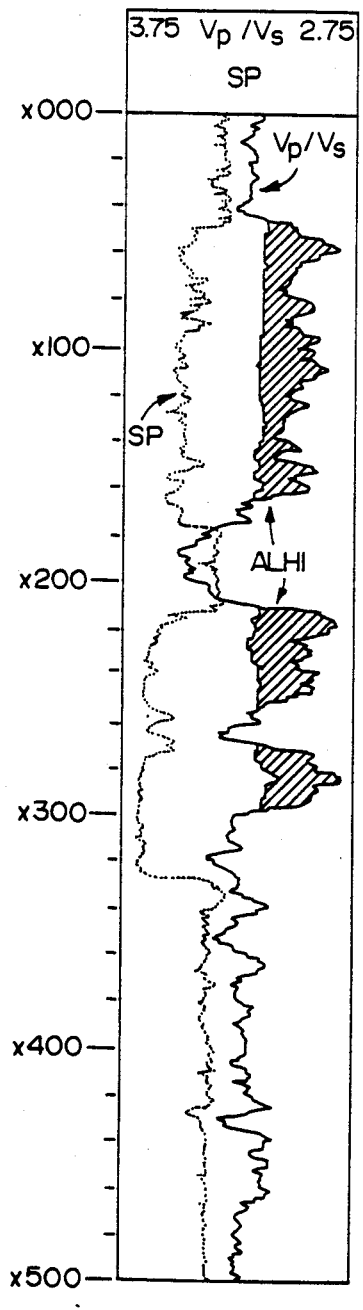
FIG. 12 depicts an example of an acoustic log hydrocarbon indicator (ALHI) generated by the algorithm of FIG. 11.

The algorithm described above can be repeated for every pair of $\Delta t_p$ and $\Delta t_s$ values corresponds to a single measured depth in the well, and an acoustic log hydrocarbon indicator (ALHI) can be generated. One possible implementation of the ALHI log in clastic formations is shown in FIG. 12. In this case, $V_p/V_s$ (measured) is overlaid with a second log, $V_p/V_s$ (ALHI). The second is defined as $V_p/V_s$(ALHI)=$V_p/V_s$ (measured) when
$V_p/V_s$ (measured) $\geq$ threshold
$V_p/V_s$(ALHI)=$V_p/V_s$ (minimum water-bearing clastics) when
$V_p/V_s$ (measured) < threshold.

When the two curves are overlaid, separation occurs whenever an ALHI is generated. In order to highlight these zones, the difference between $V_p/V_s$ (ALHI) and $V_p/V_s$ (measured) is shaded in FIG. 12.

Consequently, the algorithm can differentiate hydrocarbon-bearing sandstones from water-bearing sandstones and shales based on the travel time of compressional and shear waves in the formation. The algorithm does not require any other log information and is used to generate a AHLI log which will graphically indicate zones which are potentially hydrocarbon-bearing. Such ALHI log is more effective than resistivity logs in identifying low-resistivity pay zones, such as laminated sand-shale intervals. It may also be valuable in areas with fresh formation water where the resistivity of the water zones is high.

Having now described the method of the present invention in connection with a preferred embodiment, it is to be understood that various modifications and changes may be made without departing from the spirit and scope of the invention as set forth in the appended claims.

I claim:

1. A method for identifying a hydrocarbon-bearing zone in a subsurface sandstone formation, comprising the steps of:
   (a) determining first ratios of compressional wave velocity to shear wave velocity over a plurality of shear wave travel times in water-bearing sandstone,
   (b) determining a first correlation for said first compressional-to-shear wave velocity ratios over said plurality of shear wave travel times in water-bearing sandstone.
   (c) determining second ratios of compressional wave velocity to shear wave velocity over said plurality of shear wave travel times in water-bearing shale,
   (d) determining a second correlation for said second compressional-to-shear wave velocity ratios over said plurality of shear wave travel times in water-bearing shale,
   (e) determining a minimum compressional-to-shear wave velocity ratio for said first and second correlations over said plurality of shear wave travel times, from those portions of said correlations that exhibit the minimum value for compressional-to-shear wave velocity at any given shear wave travel time,
   (f) measuring a third ratio of compressional wave velocity to shear wave velocity for a measured shear wave travel time in said subsurface sandstone formation for which hydrocarbon content is to be identified, and
   (g) identifying a hydrocarbon-bearing zone in said subsurface formation when said measured third ratio of compressional wave velocity to shear wave velocity for the measured shear wave travel time in said subsurface formation is less than the determined minimum compressional-to-shear wave velocity ratio for said first and second correlations in water-bearing sandstone and shale respectively.

2. The method of claim 1 wherein said minimum compressional-to-shear wave velocity ratio for said first and second correlations is represented by
   (i) said first compressional-to-shear wave velocity ratios of water-bearing sandstone at shear wave travel times for which said first ratios are less than said second compressional-to-shear wave velocity ratios of water-bearing shale, and
   (ii) said second compressional-to-shear wave velocity ratios of water-bearing shale at shear wave travel times for which said second ratios are less than said first ratios of water-bearing sand.

3. The method of claim 1 further comprising the steps of
   (a) deriving a threshold that is offset a uniform distance below the minimum compressional-to-shear wave velocity ratio for said first and second correlations, and
   (b) identifying a hydrocarbon bearing zone in said subsurface formation when said measured third ratio of compressional wave velocity to shear wave velocity for the measured shear wave travel time in said subsurface formation falls below said threshold.

4. The method of claim 3 wherein the offset by which said threshold lies below the minimum compressional to shear wave velocity ratio for said first and second correlation is established to provide that a select percentage of measured third ratios of compressional-to-shear wave velocities in non-hydrocarbon bearing zones of the subsurface formation will be above said threshold.

5. A method for identifying a hydrocarbon-bearing sandstone zone in a subsurface formation, comprising the steps of:
   (a) determining first ratios $V_p/V_s$ (sandstone) of compressional wave velocity to shear wave velocity over a plurality of shear wave travel times $\Delta t_s$ in water-bearing sandstone,
   (b) determining a first regression line for said first ratios over said plurality of shear wave travel times $\Delta t_s$ in water-bearing sandstone in accordance with the following expression:

$$V_p/V_s(\text{sandstone}) = A + B\Delta t_s,$$

where A and B are numerical values defining a linear relationship between $V_p/V_s$ and $\Delta t_s$,
   (c) determining second ratios $V_p/V_s$ (shale) of compressional wave velocity to shear wave velocity over a plurality of shear wave travel times $\Delta t_s$ in water-bearing shale,
   (d) determining a second regression line for said second ratios over said plurality of shear wave travel times $\Delta t_s$ in water-bearing shale in accordance with the following expression:

$$V_p/V_s(\text{shale}) = C + D\Delta t_s$$

where C and D are numerical values defining a linear relationship between $V_p/V_s$ and $\Delta t_s$,
   (e) identifying a minimum compressional-to-shear wave velocity ratio min $V_p/V_s$ for said first and second regression lines over said plurality of shear wave travel times $\Delta t_s$ as being represented by (i) said first ratios for shear wave travel times $\Delta t_s$ less than a travel time $\Delta t_s'$ for which said first ratios equal said second ratio and (ii) said second ratios for shear wave travel times greater than said travel time $\Delta t_s$, (f) measuring third ratios of compressional wave velocity to shear wave velocity $V_p/V_s$ (measured) for a measured shear wave travel time in said subsurface formation for which hydrocarbon content is to be identified, (g) deriving a threshold that is offset a uniform distance below said identified minimum compressional-to-shear wave velocity ratio min $V_p/V_s$ over said plurality of shear wave travel times to establish that a select percentage of said measured third ratios in non-hydrocarbon-bearing zones in said subsurface formation will lie above said threshold, and (h) identifying a hydrocarbon-bearing zone in said subsurface formation when said measured third ratios $V_p/V_s$ (measured) fall below said threshold.

6. The method of claim 5 wherein (a) said first regression line for said first ratios in water-bearing sandstone is represented by the following expression:

$$V_p/V_s(\text{sandstone}) = 1.182 + 0.0042\Delta t_s,$$

whereby the minimum compressional to shear wave velocity ratio min $V_p/V_s$ for said first and second regression lines over said plurality of shear wave travel times is represented by the expression $V_p/V_s$ (sandstone) of water-bearing sandstone for all travel times below about 197 microseconds and is represented by expression $V_p/V_s$ (shale) of water-bearing shale for all travel times above about 197 microseconds.

7. A method for identifying a hydrocarbon-bearing sandstone zone in a subsurface formation, comprising the steps of:

(a) determining first ratios $V_p/V_s$ (sandstone) of compressional wave velocity to shear wave velocity over a plurality of shear wave travel times $\Delta t_s$ in water-bearing sandstone, (b) determining a first regression line for said first ratios over said plurality of shear wave travel times $\Delta t_s$ in water-bearing sandstone in accordance with the following expression:

$$V_p/V_s(\text{sandstone}) = A + B\Delta t_s,$$

where A and B are numerical values defining a linear relationship between $V_p/V_s$ and $\Delta t_s$, (c) determining second ratios $V_p/V_s$ (shale) of compressional wave velocity to shear wave velocity over a plurality of shear wave travel times $\Delta t_s$ in water-bearing shale, (d) determining a second regression line for said second ratios over said plurality of shear wave travel times $\Delta t_s$ in water-bearing shale in accordance with the following expression:

$$V_p/V_s(\text{shale}) = C + D\Delta t_s$$

where C and D are numerical values defining a linear relationship between $V_p/V_s$ and $\Delta t_s$, (e) measuring third ratios of compressional wave velocity to shear wave velocity $V_p/V_s$ (measured) for a measured shear wave travel time in said subsurface formation for which hydrocarbon content is to be identified, (f) determining a first variable $\epsilon$ from the following expression:

$$\epsilon = V_p/V_s(\text{measured}) - (A + B\Delta t_s),$$

(g) determining a second variable $\epsilon'$ from the following expression:

$$\epsilon' = V_p/V_s(\text{measured}) - (C + D\Delta t_s),$$

(h) identifying a hydrocarbon-bearing zone in said subsurface formation when $\epsilon$ is less than a first portion of said threshold for those shear wave travel times at less than a value $\Delta t'$ for which said first ratios equal said second ratios, and (i) identifying a hydrocarbon-bearing zone in said subsurface formation when $\epsilon'$ is less than a second portion of said threshold for those shear wave travel times $\Delta t$ greater than a value $\Delta t'$ for which said first ratios equal said second ratios.

8. The method of claim 7 wherein said first variable $\epsilon$ has the following expressions:

$$\epsilon = V_p/V_s(\text{measured}) - (1.182 + 0.00422\Delta t_s).$$

9. The method of claim 8 wherein values of $\epsilon$ less than said first portion of each threshold of about $-0.09$ identify a hydrocarbon-bearing zone in said subsurface formation.

10. The method of claim 7 wherein said second variable $\epsilon'$ has the following expression:

$$\epsilon' = V_p/V_s(\text{measured}) - (1.276 + 0.00374\Delta t_s).$$

11. The method of claim 10 wherein values of $\epsilon'$ less than said second portion of said threshold of about $-0.073$ identify a hydrocarbonbearing zone in said subsurface formation.

12. The method of claim 7 wherein said first and second portions of said threshold are determined in accordance with the following steps:

(a) determining a first frequency of occurrence plot for a plurality of values for $\epsilon$ in water-bearing sandstones, (b) determining a second frequency of occurrence plot for a plurality of values for $\epsilon'$ in water-bearing shales, (c) determining a first best fit Gaussian distribution for said first plot of $\epsilon$ values, (d) determining a second best fit Gaussian distribution for said second plot of $\epsilon'$ values, (e) determining from said first Gaussian distribution said first portion of said threshold for which only a first select percentage of water-bearing sandstones will have variables less than said threshold, and (f) determining from said second Gaussian distribution said second portion of said threshold for which only a second select percentage of water-bearing shales will have $\epsilon'$ variables less than said threshold.

13. The method of claim 12 wherein said first select percentage is about 5%.

14. The method of claim 12 wherein said second select percentage is about 5%.

* * * * *